No. 851,485. PATENTED APR. 23, 1907.
L. V. BENÉT & H. A. MERCIÉ.
GUN MOUNT.
APPLICATION FILED DEC. 22, 1906.
7 SHEETS—SHEET 1.
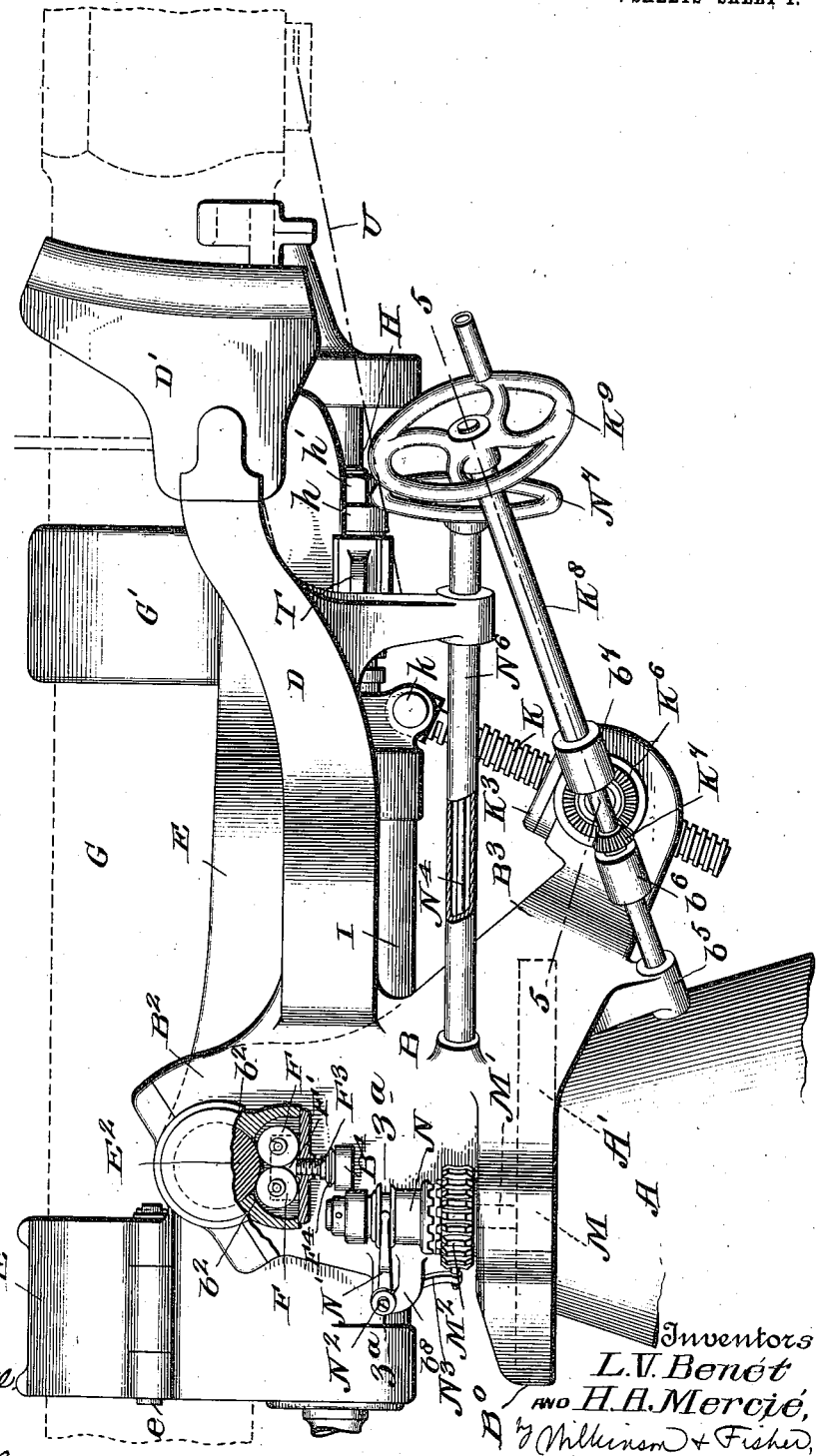
Witnesses
Geo. A. Byrne
Myron F. Clear
Inventors
L. V. Benét
AND H. A. Merciè,
by Wilkinson & Fisher,
Attorneys.

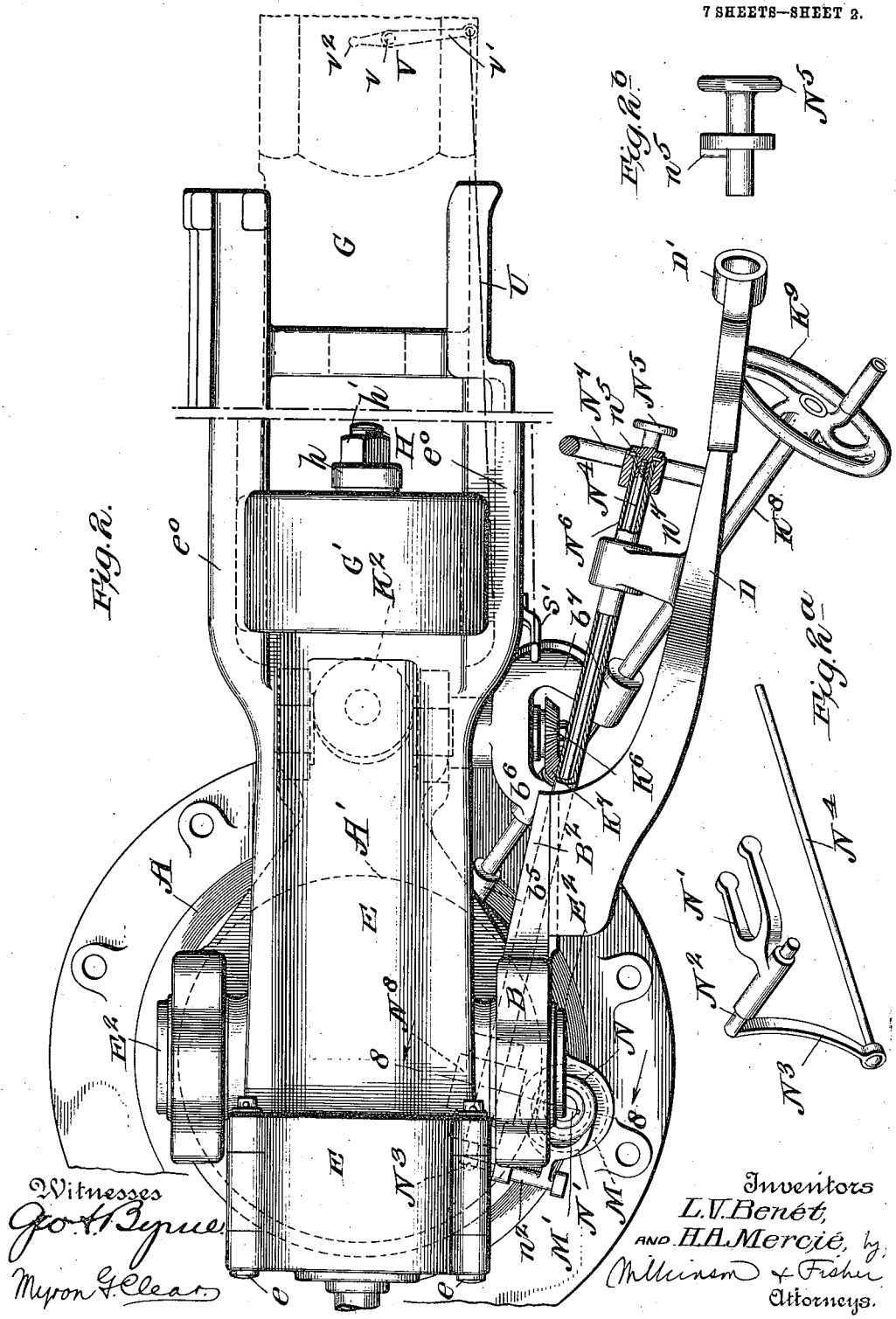

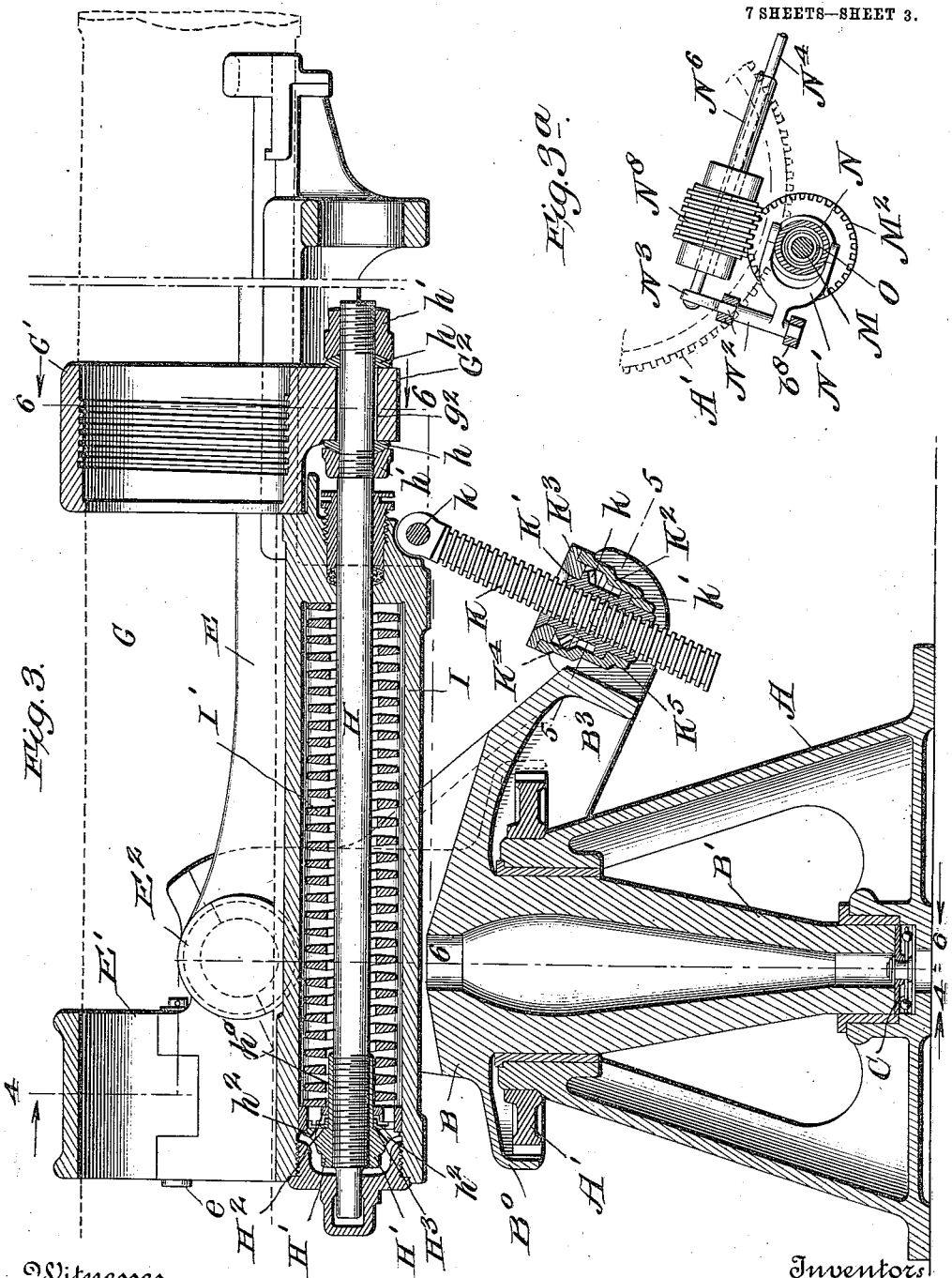

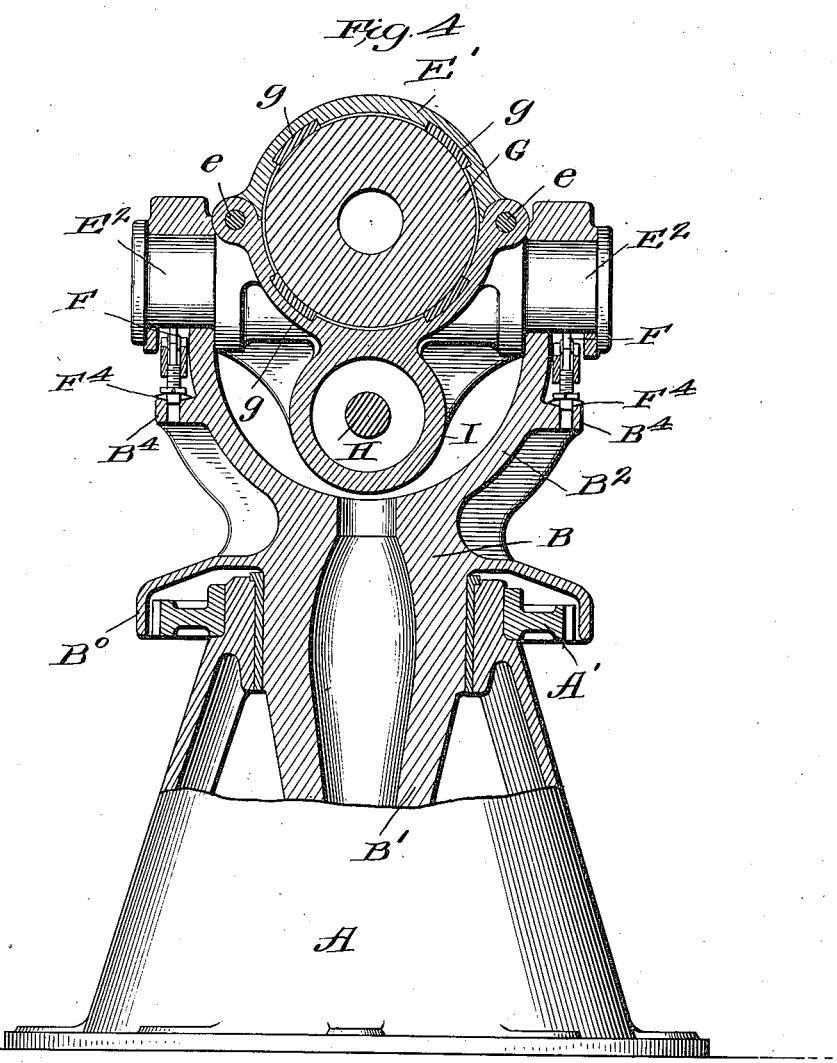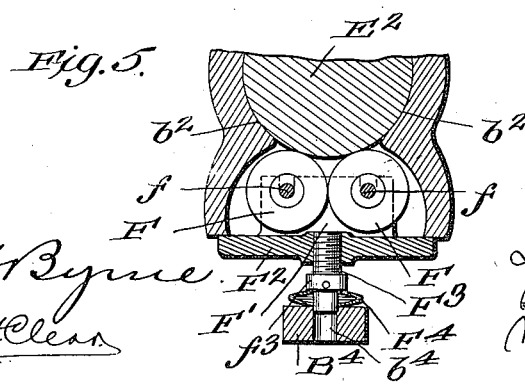

No. 851,485.

PATENTED APR. 23, 1907.

L. V. BENÉT & H. A. MERCIÉ.
GUN MOUNT.
APPLICATION FILED DEC. 22, 1906.

7 SHEETS—SHEET 5.

Witnesses
Geo. H. Byrne
Myron H. Clear

Inventors
L. V. Benét,
H. A. Merciè,
by Wilkinson & Fisher
Attorneys.

No. 851,485. PATENTED APR. 23, 1907.
L. V. BENÉT & H. A. MERCIÉ.
GUN MOUNT.
APPLICATION FILED DEC. 22, 1906.

7 SHEETS—SHEET 6.

Witnesses
Geo. H. Pynee
Myron H. Clear

Inventors,
L. V. Benét &
H. A. Mercié, by
Wilkinson & Fisher,
Attorneys

UNITED STATES PATENT OFFICE.

LAURENCE V. BENÉT AND HENRI A. MERCIÉ, OF PARIS, FRANCE.

GUN-MOUNT.

No. 851,485.   Specification of Letters Patent.   Patented April 23, 1907.

Application filed December 22, 1906. Serial No. 349,174.

*To all whom it may concern:*

Be it known that we, LAURENCE V. BENÉT, a citizen of the United States, and HENRI A. MERCIÉ, a citizen of the French Republic, both residing at Paris, France, have invented certain new and useful Improvements in Gun-Mounts; and we do hereby declare the following to be a full, clear, and exact description of the invention, such as will enable others skilled in the art to which it appertains to make and use the same.

Our present invention relates to improvements in gun mounts, and is intended to provide an improved means for guiding the gun during the recoil and counter-recoil, and for facilitating the counter-recoil movement.

It also relates to improvements in elevating and training gear, and in means for reducing the friction of the cradle on its trunnions, whereby elevating is facilitated.

It further relates to improvements in firing gear, whereby the gun may be fired even before it has entirely returned to the initial or in battery position, and at the same time the gunner may be protected against the recoil of the gun.

These various improvements just referred to are included in the single structure hereinafter described and shown in the accompanying drawings, in which the same parts are indicated by the same letters throughout the several views.

Figure 6:
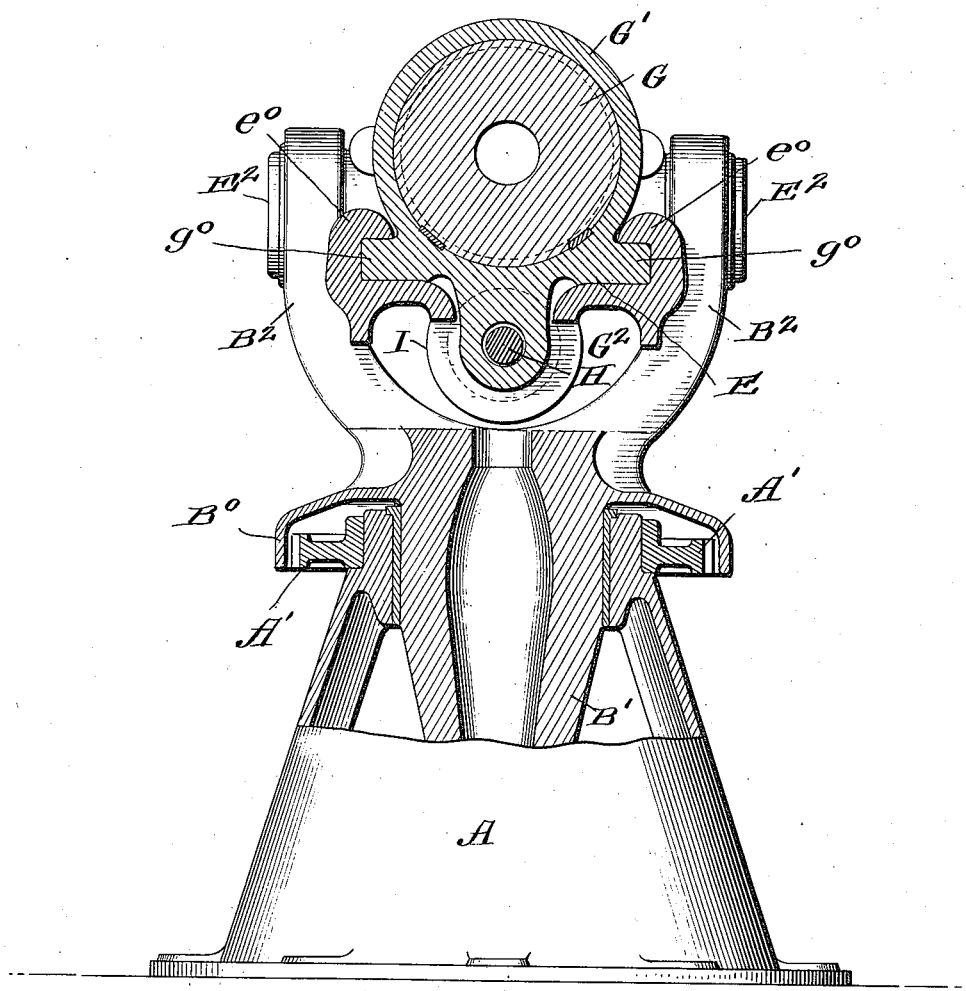
Figure 7:
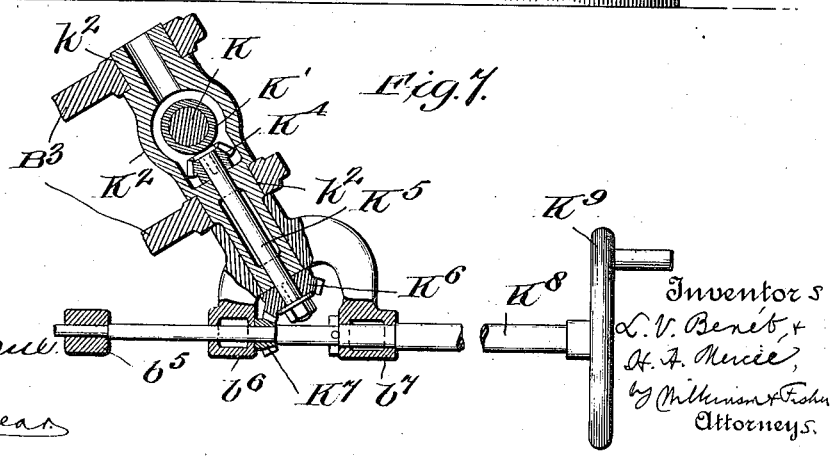
Figure 8:
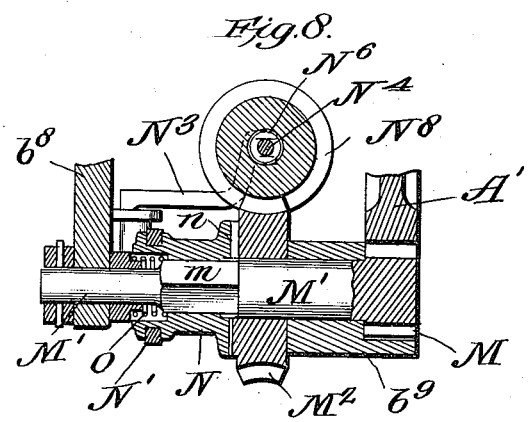

Figure 1 is a side elevation of the gun mount, the gun being shown in dotted lines, and parts being broken away. Fig. 2 is a plan view of the gun mount, the gun being indicated in dotted lines. Figs. 2ª and 2ᵇ are details of part of the apparatus used in throwing the training gear into and out of engagement. Fig. 3 is a central vertical section through the gun mount, the gun being shown in dotted lines, and parts being shown in elevation. Fig. 3ª is a detail showing part of the training gear. Fig. 4 is a section along the broken line 4—4 of Fig. 3, and looking in the direction of the arrows. Fig. 5 is a detail showing the anti-friction support of the trunnions for the cradle, the parts being shown on a larger scale than in Fig. 1. Fig. 6 shows a section along the broken line 6—6 of Fig. 3 and looking in the direction of the arrows. Fig. 7 shows a section through the elevating gear along the line 5—5 of Figs. 1 and 3. Fig. 8 shows a section through the training gear along the line 8—8 of Fig. 2, and looking in the direction of the arrows.

Figure 10:
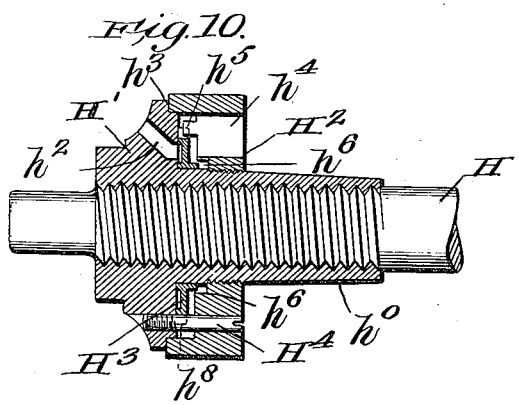
Figure 9:
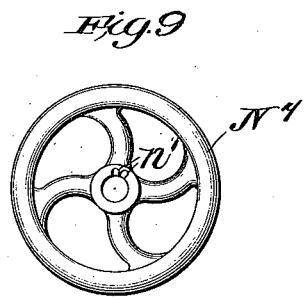
Figure 11:
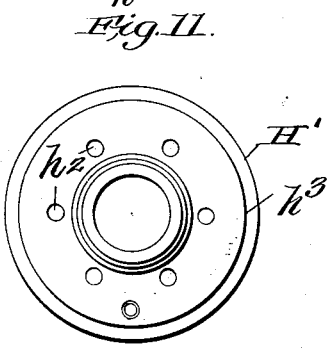
Figure 12:
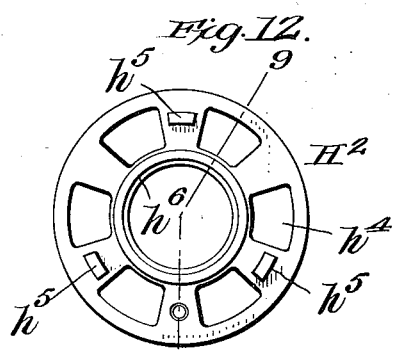
Figure 13:
Figure 14:
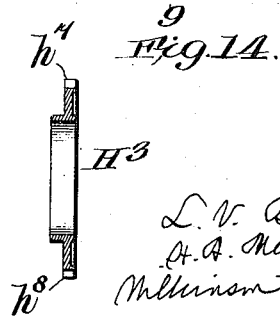
Figure 15:
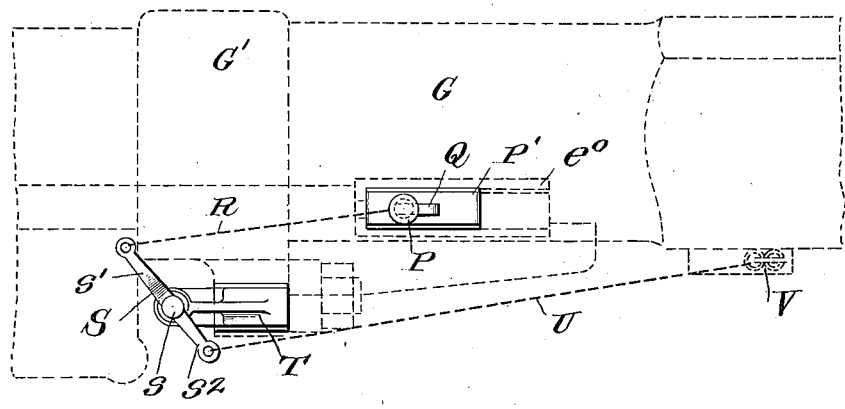
Figure 16:
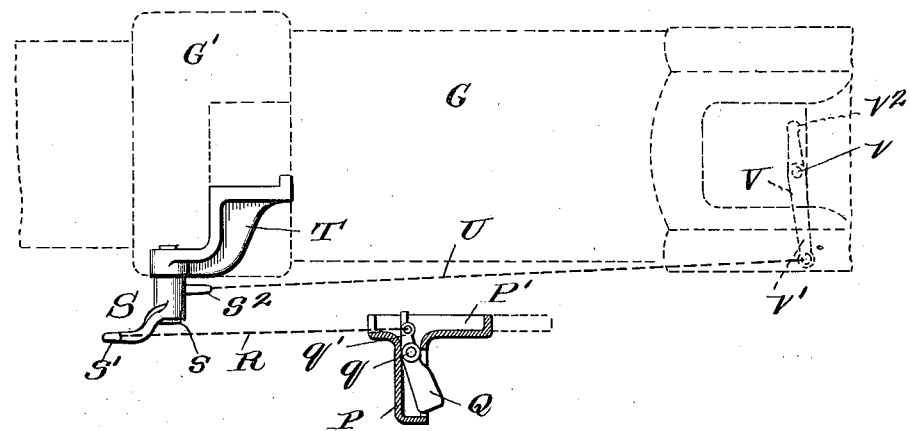
Figure 17:
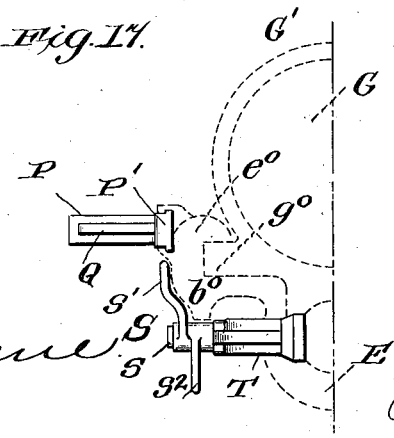

Fig. 9 is an end view of the hand wheel used for operating the training gear. Fig. 10 shows a section through the piston of the recoil cylinder, the parts being shown on a larger scale than are indicated in Fig. 3. Fig. 11 is a detail showing an end view of the piston head shown in Fig. 9, as seen from the right of said figure. Fig. 12 is a detail showing the piston spider or guide detached from the piston and as seen from the left of Fig. 9. Fig. 13 is a detail showing the sliding valve carried in the piston head, and Fig. 14 shows a section along the line 14—14 of Fig. 13 and looking in the direction of the arrows. Fig. 15 shows diagrammatically, and in elevation, the operating gear which connects the carriage with the firing gear. Fig. 16 is a plan view of the device shown in Fig. 15, parts being broken away, and Fig. 17 is an end view of the device shown in Figs. 15 and 16. In the last three figures, the gun and cradle are shown in dotted lines.

A represents the pedestal of an ordinary naval mount, such as is well known in the art. While the invention is specially applicable to naval mounts carried by a movable gun platform, it is also applicable to any type of mount in which the gun is mounted to recoil in a cradle, which latter is journaled in trunnions and is swung laterally by training mechanism of a suitable type. This pedestal carries the fixed circular rack A', in which the pinion of the training gear meshes, as will be hereinafter described.

B represents the upper carriage in which the cradle is trunnioned on the yoke B². This upper carriage is provided with the ordinary pillar B', which rests on ball bearings C carried in the base of the pedestal A. This upper carriage is provided with an overhanging hood B⁰ to protect the gearing, and with a rearwardly extending horn B³, in which the elevating gear is mounted, as will be hereinafter described. It is also provided with lugs B⁴ beneath the trunnions. For convenience in pointing the gun, the shoulder bar D is secured to the upper carriage, and is provided with a shoulder rest D'.

The cradle is composed of two members E and E'. The lower member E is provided with trunnions E², and with the usual guides for the gun, while the upper member E' is connected to the lower member E by means of the bolts e, and the two together form a sleeve having suitable guides in which the gun recoils.

The trunnions E² are mounted in curved seats b², which are cut away at the botom, as shown in Fig. 5, and the lower portion of the trunnions rest on anti-friction rollers F having small shafts f, which shafts are journaled in ribs F' carried by the plates F². These plates are supported by the screws F³ having collars f³ mounted above the cup springs F⁴, which are held above the lugs B⁴, as shown in Fig. 5. The ends of these screws project down into slots b⁴ in said lugs, and by adjusting the screws the trunnions E² may be wholly or partly supported on the anti-friction rollers F. This reduces the friction in swinging the cradle through a vertical angle, as in elevating or depressing the gun, while the trunnion seats b² take up the shock of recoil and counter-recoil, the rollers F yielding freely under the heavy strain, due to their elastic mounting. The gun body G is provided with guide ribs g, see Fig. 4, which slide in the sleeve of the cradle during the recoil and counter-recoil of the gun.

Secured on the gun body, preferably screwed thereon, is a sleeve G', which carries the downwardly projecting lug G², which is bored, as at g², with a larger diameter than that of the piston rod H, so that the said piston rod may have free play in said bore g². Secured on this piston rod at each side of the lug G² are the spherical washers h, which are held in shape by the cup-shaped nuts h'. By this arrangement, the piston rod H is securely attached to the lug G², and yet is allowed a limited play therein, so that any wedging or binding, which might result from insufficient parallelism between the gun and the piston rod, is avoided. This prevents wear of the gland, jamming of the rod on counter-recoil, and leaks due to wear of parts.

Near the forward end of the piston rod the piston is mounted in the recoil cylinder I, which contains the return spring I', as shown in Fig. 3. The usual tapered contracted passage (not shown) between the piston and the cylinder is provided to check the recoil of the gun, as is well known in the art. The piston comprises the piston head H', the spider or guide H², and the sliding valve H³. The piston head H' is perforated, as at h², to permit the passage of liquid therethrough on counter-recoil, and is also provided with a shoulder h³ against which the guide abuts, which guide is in the form of a spider perforated, as h⁴, and having guide lugs h⁵, and an annular recess h⁶, see Figs. 10 and 12. The piston head H' is screwed on the piston rod H, and the guide H² is screwed on the hub of the piston head.

Mounted to slide between the piston head H' and the guide H² is the valve H³. As the gun recoils, the pressure of the liquid presses this valve towards the piston head, closing the ports h²; but when the gun goes forward on counter-recoil, the pressure of the liquid on the other side of the piston head will move this valve back, opening the ports h², and thus permitting the liquid to flow freely through the piston head on counter-recoil. In this way, the full effect of the hydraulic brake is secured on recoil, but the brake is released on counter-recoil, and thus the resistance to the operation of the return spring I', on counter-recoil, is lessened.

The valve H³ is provided with guides h⁷ to engage the guide lugs h⁵ on the guide H², and the piston head H' and the guide H² are held against relative angular movement by means of the locking pin H⁵, which locking pin also passes through a guide slot h⁸ in the valve H³, as shown in Fig. 13. Thus it will be seen that the valve is free to move longitudinally on the hub of the piston head, but is held against turning thereon.

Thus it will be seen that by the herein described arrangement of recoil cylinder, piston and piston rod, and the means for connecting the piston rod to the gun, not only is the binding of the rod prevented, owing to lack of parallelism between the gun and the cylinder, as before described, but also the gun is checked on recoil by the pressure of the liquid in the recoil cylinder, and this pressure is largely relieved on counter-recoil. The latter not only relieves the return spring of unnecessary strains, but also permits the gun to return more promptly to the initial position on counter-recoil. This quick motion on counter-recoil is specially desirable when the breech mechanism is operated semi-automatically.

The elevating gear comprises a screw K, which is hinged, as at k, to the cradle of the gun and projects down into a yoke formed in the rear of the horn B³ projecting rearwardly from the upper carriage.

K' is a nut which is mounted on the screw K, and is provided with a bevel gear k, see Figs. 3 and 7, which meshes with a bevel gear K⁴ carried by the shaft K⁵, which is journalled in the casing K², which casing is trunnioned, as at k², in the yoke at the rear end of the arm B³, so that this casing may rock slightly as the screw K moves longitudinally relatively to the nut K'. This nut K' is turned by means of the bevel gear K⁴, shaft K⁵, and bevel gear K⁶, which latter meshes with the bevel gear K⁷ on the shaft K⁸, carrying the hand wheel K⁹. This shaft K⁸ is journalled in suitable bearings b⁵, b⁶, and b⁷, carried by the upper carriage B. It will be noted that the elevating screw K is located vertically beneath the axis of the gun, and thus is in the best position to take up the downward whip of the breech of the gun, when the latter recoils; while at the same time the elevating gear may be conveniently operated by the man at the shoulder bar.

The training may be done by either swinging the upper carriage laterally by means of the shoulder bar D, or by the training gear that will be hereinafter described; but it is preferable to effect the coarse training by means of the shoulder bar, meantime throwing the training gear out of operation, and then to throw the said gear into operation, and to effect the fine training by the mechanism provided for that purpose, which will now be described.

Referring more especially to Figs. 1 to 3$^a$, and 8, M represents a pinion meshing with the circular rack A' carried by the pedestal A. This pinion is fast on the shaft M', which carries, loosely mounted thereon, a worm wheel M$^2$, and is journaled in suitable bearings $b^8$ and $b^9$ carried by the upper carriage B. Part of this shaft M' is squared, as at $m$, to receive the clutch member N, which is provided with teeth $n$ normally pressed into engagement with similar teeth on the worm wheel M$^2$, by means of the spring O. This clutch member N is moved into and out of engagement by a yoke N', shown in detail in Fig. 2$^a$, which is rocked by the shaft N$^2$ carrying the crank arm N$^3$, to which the rod N$^4$ is connected. This rod N$^4$ passes through the hollow rod N$^6$ carrying the hand wheel N$^7$, and the said rod N$^4$ terminates in a head N$^5$ having a tooth $n^5$ adapted to engage in one or the other of the notches $n^7$, see Fig. 9, of the hand wheel N$^7$. One of these notches is deeper than the other, and when the tooth $n^5$ rests in the deep notch, the clutch member N is thrown into engagement with the worm wheel M$^2$, and causes this wheel to turn with the shaft M'; while when this tooth $n^5$ engages in the shallower notch $n^7$, the clutch member N is held out of engagement with the worm wheel M$^2$, and the latter is free to turn on the shaft M'. Thus it will be seen that when the clutch member N is disengaged, the upper carriage, with the gun and cradle, may be swung laterally about the pedestal by means of the shoulder bar, in which case the pinion M and the shaft M' rotate idly, the worm wheel M$^2$ being held in engagement with the worm N$^8$, carried by the hollow rod N$^6$, see Fig. 8. If, however, the clutch member N be thrown into engagement with the worm wheel M$^2$, the shaft M' will be locked to the said worm wheel, and it will be impossible to train the gun from the shoulder bar, but the training must be effected by turning the hand wheel N$^7$, which will turn the wheel N$^8$, rotating the worm wheel M$^2$, the shaft M', and the pinion M, which latter meshes with the fixed circular rack A' carried by the pedestal A. Thus it will be seen that by throwing the clutch out of engagement, it will be possible to train the gun laterally by means of the shoulder bar, which will be sufficient for quick and rough training, while the fine and exact training may be done by the training gear, which is thrown into action by simply releasing the clutch member N.

In order to provide a suitable firing gear, which may be safely operated before the gun is entirely run out to the initial position, we have devised the arrangement shown in Figs. 15 to 17, in which the operating handle is placed on a part of the carriage which does not recoil, and is connected with the firing gear of the breech by an intervening device carried by the recoiling part. This gear, by way of example, consists of a handle P forming part of a sliding carrier P', which slides in the guide $e^0$ in the cradle. In this carrier is pivoted, as at $q$, a trigger Q having a short arm $q'$ connected by the cord R to the arm $s'$ of the lever S, which is pivoted as at $s$ to the bracket T carried by the gun body G. The other arm $s^2$ of this lever S is connected by the cord U to the arm $v'$ of the lever V of the firing mechanism, which lever is pivoted, as at $v$, and has its arm $v^2$ operating the firing mechanism in the usual way.

We do not claim any special invention in the firing mechanism *per se*, but only in the means of operating the same. It will be seen that as the gun recoils, the cord R will slacken up, and if the gun does not go fully forward on counter-recoil, this cord R will remain slack, but it may be quickly drawn taut by drawing the handle P back until the requisite tension is given to the cord, and then by pressing the palm of the hand on the trigger Q at the desired moment of firing, the further requisite tension will be given to the cord R for operating the firing gear, without altering the position of the handle P.

It will be obvious that various modifications may be made in the herein described apparatus that can be used without departing from the spirit of our invention.

Having thus described our invention, what we claim and desire to secure by Letters Patent of the United States, is:—

1. In a gun mount, the combination with the cradle and the gun body mounted to recoil therein, of a recoil cylinder carried by the cradle, a piston mounted in said cylinder, a piston rod connecting said piston and the gun body, and means for permitting the passage of the liquid in said cylinder through the piston on counter recoil, comprising a plurality of perforations in the piston head, a longitudinally movable annular valve adapted to close said perforations during the recoil of the gun and to uncover said perforations on counter recoil and a spider secured on said piston in rear of said annular valve, said spider being slotted to allow the annular valve a limited longitudinal play therein substantially as described.

2. In a gun mount, the combination with a cradle having rearwardly projecting guides, of a gun body mounted to recoil in said cradle and provided with a band having a longitudinally perforated lug projecting therefrom, a recoil cylinder secured to said cradle and provided with a piston and a return spring, and a piston rod of less diameter than the perforation in said lug and projecting therethrough, with spherical washers and cup-shaped nuts mounted on said piston rod on each side of said lug, substantially as described.

3. In a gun mount, the combination with a cradle having rearwardly projecting guides, of a gun body mounted to recoil in said cradle and provided with a band having a longitudinally perforated lug projecting therefrom, a recoil cylinder secured to said cradle and provided with a piston and a return spring, the said piston being provided with passages therethrough, with means for closing said passages on recoil and for opening same on counter recoil, and a piston rod of less diameter than the perforation in said lug and projecting therethrough, with spherical washers and cup-shaped nuts mounted on said piston rod on each side of said lug, substantially as described.

4. In a gun mount, the combination with the pedestal or lower carriage, of an upper carriage mounted to rotate laterally thereon, a cradle provided with trunnions journalled in said upper carriage, a plate, anti-friction rollers journalled in said plate and mounted beneath each of said trunnions, a screw journalled to the upper carriage and engaging threads in said plate, and adapted to press the plate upwards, a collar on said screw, and annular cup springs mounted beneath the collar on said screw forming an adjustable spring support for said anti-friction rollers, substantially as described.

5. In a gun mount, the combination of the pedestal or lower carriage, of an upper carriage mounted to swing laterally on said lower carriage, a shoulder bar secured to said upper carriage, hand operating training gear adapted to turn said upper carriage on said lower carriage, comprising a circular rack fast to the lower carriage, a pinion journaled in the upper carriage and meshing with said rack, a worm wheel loose on the shaft of said pinion, a clutch member adapted to lock said worm wheel on said shaft, a hand rod for throwing said clutch member out of engagement when desired, and a hand operated worm meshing in said worm wheel, substantially as described.

6. In a gun mount, the combination of the pedestal or lower carriage, of an upper carriage mounted to swing laterally on said lower carriage, a shoulder bar secured to said upper carriage, hand operated training gear adapted to turn said upper carriage on said lower carriage, comprising a circular rack fast to the lower carriage, a pinion journaled in the upper carriage and meshing with said rack, a worm wheel loose on the shaft of said pinion, a spring impressed clutch member adapted to normally lock said worm wheel on said shaft, a hand rod for throwing said clutch member out of engagement when desired, and a hand operated worm meshing in said worm wheel, substantially as described.

7. In a recoil mount for guns, the combination with a carriage, of a cradle trunnioned in said carriage, a gun mounted to recoil in said cradle, firing mechanism carried by the gun, and actuating mechanism for said firing mechanism, comprising a laniard carried by the gun body, a sliding carrier connected to the cradle and provided with a trigger, and means operated by said trigger for pulling on said laniard when desired, substantially as described.

8. In a recoil gun mount, the combination with the trunnioned cradle, of the gun mounted to recoil therein, firing mechanism carried by the gun, a lever connected to the gun, a laniard connecting said lever and said firing mechanism, a sliding carrier mounted on the cradle and provided with a trigger, and a second laniard connecting said trigger and said lever, substantially as described.

9. In a recoil mount for guns, the combination with the trunnioned cradle, of a gun body mounted to recoil in said cradle, firing mechanism carried by said gun body, a lever carried by said gun body in front of said firing mechanism, a laniard connecting said lever and said firing mechanism, a carrier mounted to slide in said cradle, and located in rear of said lever, and a trigger lever mounted in said sliding carrier with a laniard connecting said trigger lever with the lever carried by the gun body, substantially as described.

In testimony whereof, we affix our signatures, in presence of two witnesses.

LAURENCE V. BENÉT.
HENRI A. MERCIÉ.

Witnesses:
J. A. CHOUINARD,
A. C. KOERNER.